2,813,034
Patented Nov. 12, 1957

2,813,034

METHOD OF PRODUCING SYNTHETIC SAUSAGE SKINS AND PRODUCTS PRODUCED THEREBY

Richard Weingand, Walsrode, and Heinz Reissmann, Fallingbostel, near Walsrode, Germany No Drawing. Application December 7, 1951, Serial No. 260,565

5 Claims. (Cl. 99—176)

This invention relates to a method of producing synthetic sausage skins and similar laminar structures, and to sausage skins produced in accordance therewith.

The synthetic intestines used in the trade consist for the most part of cellulose and are mostly either stuck together from parchment paper or produced in seamless form from solutions of cellulose such as viscose. Other methods of production commence with decomposed skin fibres which are hardened with formaldehyde or similar agents after having been formed.

None of these synthetic sausage skins are fit for consumption with the sausage substance, in contradistinction to natural intestines, as a result of their indigestibility. For boiling sausages on the other hand, for example, Frankfurter or Halberstädter sausages, sheep intestines having a small diameter of from about 20 to 30 mm., and a high strength, which are imported from overseas in large quantities, are as a rule used as it is usual to consume these sausages jointly with their skin. In the manufacture of these sausages with the aid of synthetic skins, the sausage mass is initially filled into a seamless cellulose intestine which is removed after the sausage has been cooked and smoked, so that the sausages can be conserved in tins without their skins.

The present invention aims at enabling a synthetic sausage skin to be produced which is practically equal to natural intestines in all its properties including also its edibility. Such a synthetic intestine must not only combine a very high mechanical strength with a certain extensibility as well as being resistant to boiling and smoking but must also be able to adhere as tightly as possible to the sausage meat, whilst not being too tough, that is, not possessing a structure acting harmfully on consuming the sausage, and in addition, despite high strength, must have a very small wall thickness which favours its edibility and digestibility.

It has now unexpectedly been found that these, in part contradictory, demands are satisfied by a synthetic sausage skin which has been prepared using a salt of alginic acid. Comprehensive tests have shown that a synthetic intestine consisting wholly or mainly of alginic acid, or of an insoluble alginate, not only possesses the desired boiling and smoking resistance required of sausage skins, and the necessary adherence to the sausage meat, but also possesses a very high mechanical strength, and can be easily brought to the desired small degree of extensibility, as well as being fit for human consumption and which can be given the requisite thin wall thickness therefor without detriment to its favourable mechanical properties.

A preferable starting material for the synthetic intestine in accordance with the invention is water-soluble sodium alginate, such as is, for example, used as a thickening agent for jam. It is preferable to use a starting material which has been decomposed as little as possible, that is which possesses a high viscosity as this then has a very high degree of polymerisation, and the intestines prepared therefrom possess an especially high strength.

Synthetic intestines in accordance with the invention can be manufactured by dissolving the sodium alginate in water to such a concentration that a solution is obtained which can still be formed, and which preferably contains about 4 to 6% of sodium alginate. In order to achieve special colouring effects, for example, that of a dull synthetic intestine, or also to improve the mechanical properties of the synthetic sausage skin, for example, to decrease its extensibility, suitable additions may be made to the starting solution, such as, for example, paraffin or fat emulsions, cellulose or cellulose compounds soluble in water or alkali, or casein. In order to bring these additions into solution, alkali must, if necessary, be added to the starting solution.

After the prepared starting solution has been filtered and freed from the air bubbles contained therein by being allowed to stand or by being evacuated, said solution is extruded through an annular nozzle into a coagulating bath which preferably consists of a 10 to 15% weakly acid calcium chloride solution. The tube formed from the solution by means of the nozzle is subjected to a coagulation on entering said bath and is solidified into a synthetic intestine on its passage through the bath.

Preferably the synthetic intestine is expanded by about 50% of its diameter when it has been wholly or partially precipitated by blowing in air, or by hydrostatic pressure. In this way not only the demands due to the special stresses in the transverse direction of the intestine walls occuring on filling the intestine, which are twice as high as those in the longitudinal direction, are satisfied by improving the transverse strength of the synthetic intestine, but also the tendency to shrink in the transverse direction is increased which is of importance for the close fitting and adherence of the intestine to the sausage meat.

In order to bring the extensibility of the synthetic intestine produced to the desired small value, it is advisable to subject the intestine to an after-hardening. This can, for example, be effected with the aid of a dilute aqueous aluminium salt solution or also by a complete or partial esterification of the COOH group of the alginic acid.

Finally the tube prepared from alginic acid or alginate will also be purified by washing out the residues from the precipitating bath adhering thereto, and can then be put on the market in the moist state, if necessary, with a preserving agent. If the synthetic intestine is to be dried, then it is treated with a dilute glycerine solution or a similar plasticiser.

It has been found that the mechanical properties of the synthetic intestine prepared in accordance with the invention are so advantageous that these satisfy all the mechanical demands that are made of a sausage skin already with a wall thickness of less than 20 $\mu$, for example, 10 $\mu$, and not only in this respect but also as regards edibility constitute a completed substitute for natural intestines.

It has been ascertained that in the practical carrying out of the individual stages of the production of synthetic sausage skins of the foregoing type or similar tubular structures from aqueous alginate solutions by treatment with salt solutions, the complete conversion and dehydration of the coagulated tube takes a relatively long time even when salt solutions at a high concentration are used, which time, by way of example, amounts, when a thickness of 0.01 mm. is to be attained by the dried tube wall, to 3 hours in the case of a precipitating bath of a 15% calcium chloride solution, and to 2 hours in the case of a precipitating bath of a 30% calcium chloride solution. It is extraordinarily difficult, as a result of this substantial time taken by the precipitating process, to adapt the production of tubular, or indeed of laminar structures in general, form aqueous solutions of alginates to be a continuous process in the manner desired in practice.

Exhaustive experiments have now shown that this period of time can be very substantially decreased, without trouble, to a value small enough to enable a continuous mode of operation, if the dehydration and conversion of the coagulated tubular or other laminar structure is carried out at one particular definite point during the process of its production from alginate, at which the properties of the structure promise a favourable result for a water-removing treatment.

Based on this discovery the production of synthetic sausage skins and other laminar structures from alginates by means of precipitating baths is, in accordance with the invention, perfected in that the laminar structure formed is subjected to the action of strong dehydrating agents at a point where it has just been freshly precipitated and still contains a substantial proportion of water, whereupon it is further treated and finished by a continuous process in known manner.

In this way not only is a substantial dehydration of the alginate structure but also a complete conversion of alginate into metallic salt, for example alkaline earth metal salt, achieved, and these two processes can in addition be effected in a very short time, so that the whole precipitating period instead of taking several hours now only lasts a number of minutes not hindering the continuous carrying out of the successive operative measures. In this way not only is the solidification of the alginate structure substantially accelerated but also the operational speed of the whole process.

The practical realisation of this further development of the herein described process can be effected by subjecting the freshly precipitated structure of alginate or alginic acid, in which precipitating agent is still incorporated, to the influence of a temperature of above 40° C., preferably of 70° to 80° C., after having gone through the precipitating bath, whereby the soaked in water is extensively removed from the structure, and practically the whole of the alginate is converted into a metallic salt, whereupon the component crystallised out is washed out of the structure and this is dried, on occasion, after treatment with a plasticiser. The conversion and dehydration of the coagulated structure is effected in this way to a completely satisfactory extent within 15 minutes.

The herein described process may also be carried out by conducting the freshly precipitated laminar structure through a calcium chloride solution or similarly acting salt solution, which is heated to above 40 C., preferably 70° to 90° C. If, for example, a 30% calcium chloride solution which is heated to 80° C., is used for this purpose, the desired dehydration and conversion of the alginate structure is again achieved within 15 minutes. The coagulated structure, still having a large water content, can furthermore be treated with an aqueous methanol solution, preferably containing about 70% methanol, in order to realise the object of the invention. In order to economise in methanol, the same can be partly replaced by calcium chloride. Thus, for example, a solution consisting of 35% of calcium chloride dissolved in a methanol-water mixture containing 30% of methanol and 35% of water can be used.

The invention will be illustrated by the following non-limitative examples:

*Example 1*

A tube formed from an aqueous 5% sodium alginate solution is treated for 2 minutes in a slightly acidified 15% calcium chloride solution heated to 90° C., after having been coagulated, and is then further worked up in the customary manner. The precipation, dehydration, alginate conversion, and washing out takes about 15 to 20 minutes.

*Example 2*

A sheet formed from an aqueous 6% alginate solution is, immediately on leaving the precipitating bath consisting of a 10% calcium chloride solution, conducted through a chamber heated to 80° C., then washed, and thereupon treated with a plasticiser, for example, glycerine, and finally dried. The period for which the sheet was subjected to the influence of the elevated temperature which has the effect of accelerating the reaction and the dehydration, amounted to about 15 minutes. The sheet can be used for the production of a tube by being glued at the edges.

*Example 3*

A tube formed from an aqueous 5% sodium alginate solution, after having been precipitated in a weakly acidified 15% calcium chloride solution at room temperature, is immediately afterwards conducted through a calcium chloride solution heated to 70° C., and then further treated in the customary manner. A period of 15 minutes was necessary for the alginate conversion and dehydration.

*Example 4*

A tube formed from an aqueous 10% alginate solution is, immediately after passing through a precipitating bath consisting of a 15% calcium chloride solution, conducted through a methanol-water mixture with a methanol content of 70%, and then further treated and finished as usual.

In order to reduce the extensibility of the intestine produced to the desired small amount, in the production of synthetic sausage skins using a salt of alginic acid as starting material, a certain content of fibres may also be included in the tube wall, instead of providing therefor a hardening after-treatment of the intestine wall, in order to satisfy especially the requirement of avoiding a too extensive stretch in the longitudinal, and above all in the transverse direction, as a result of the high mechanical stressing during filling.

This is achieved, in accordance with the invention, by incorporating fibrous products of vegetable or animal origin in the tube wall, during the production of synthetic intestines from an alginate. In this manner the stretch of such synthetic intestines can be adjusted to the desired low degree with the aid of simple agents and measures, without impairing the good mechanical properties of the intestine.

The most diverse animal or vegetable fibres are suitable as additions such as, for example, cellulose fibres, alginate fibres, cotton fibres, meat fibres freed from fat, ramie fibres or the like. A random distribution of the fibres in the synthetic intestine wall is preferred, and a mutual interweaving or interlocking of the fibres to a type of felt, which may be especially easily effected with the aid of crimped fibres. The length of the fibre must not be too great so as to avoid blocking up the annular nozzle used for forming the intestine tube from the spinning substance. On the other hand however too short a fibre is unsuitable for effecting the desired felt formation. The optimum length lies at about 1 mm. for cellulose fibres, cotton fibres, and similar fibres. The fibre thickness, on the other hand, is determined by the nature of the fibre used in each case and, in general, differs little among the individual sorts of fibre used.

The degree to which the stretch of the synthetic intestine, consisting of alginic acid or an insoluble alginate, is decreased, depends on the length as well as the positioning, and also the crimp of the fibres incorporated in the intestine wall, and can be regulated as desired within certain limits by altering these factors. As a rule it is advantageous to incorporate into the synthetic intestine, fibres with an average length of 1 mm., and in an amount of 10% referred to the dry substance. By way of example, the stretch of an alginate intestine may be reduced by 50%, by an addition of 10% of cotton fibres, as compared with a synthetic sausage skin prepared from the same starting material but without the addition of fire.

The fibrous products can be added to the alginate spinning solution. They can also be preliminarily dispersed in the solvent to be used for producing the extruded material, for example, water, and the salt of alginic acid can then be stirred into this suspension. The fibres can also be dispersed in only a small part of the total amount of solvent, and the alginate can be dissolved in the bulk of the solvent, and the solution and the suspension can then be mixed together. Finally the incorporation of the fibres into the synthetic intestine may also be effected by preparing a homogeneous mixture thereof with the dry substance, i. e., the alginate, serving as starting material, and using this mixture for the formation of the spinning solution.

In order to increase the adherence of the intestine to the sausage meat it may be advantageous to incorporate the fibres into the intestine mass in such a manner that the fibres stick out in part from the intestine wall on the inside and so to effect an intimate combination with the sausage meat. This effect can also be achieved by subsequently treating the inner wall of the intestine with a fibre pulp so that the fibres are retained sticking to the intestine wall.

*Example 5*

0.5 kilogrammes of crimped cotton fibres about 1 mm. long, are dispersed in 100 litres of water whilst stirring, and the dispersion is added while stirring, to 5 kilogrammes of sodium alginate of a high viscosity at room temperature. The liquid thus obtained is allowed to stand for 3 days, during which time it becomes deaerated and completely homogeneous, so that it can be thereupon converted into tubular form by the customary method. The tube obtained may be expanded to only half the diameter, as a result of the corresponding decrease of its stretch, in comparison with a synthetic intestine produced from alginate without the addition of fibre.

*Example 6*

0.5 kilogrammes of cellulose fibres are dispersed in 25 liters of water whilst stirring and 5 kilogrammes of sodium alginate dissolved in 95 litres of water whilst stirring. The suspension prepared and the solution obtained are in their turn mixed with each other whilst stirring, so that a spinning solution with a content of 4% of alginate results. The synthetic intestine produced therefrom in known manner exhibits a degree of stretch reduced by about 50% compared to an alginate intestine containing no fibre.

In practice it has been found that, when synthetic intestines produced from calcium alginate in accordance with the present invention are used, and when these calcium alginate intestines come into contact with stuffing or liquids containing common salt or in general sodium, an exchange of the sodium of these substances or liquids with the calcium of the intestine wall takes place, so that the synthetic intestine is transformed in part into the sodium alginate which possesses a higher degree of swelling than the calcium alginate, so that the intestine has suffered more or less in mechanical strength on completion of this base exchange. Care must therefore be taken, for example, in the case of Frankfurter or Vienna sausages with a calcium alginate intestine, that these are smoked and cooked as soon as possible after the intestine has been filled and that they are soon consumed.

This necessity can be avoided in accordance with the present invention when using synthetic intestines produced from calcium alginate in contact with a stuffing or a treatment liquid containing a sodium salt by incorporating calcium salts or similar metallic salts which are harmless to the human organism, with the stuffing or the liquid or in the wall of the intestines, in such amounts that an exchange of the calcium of the intestine wall with the sodium of the filling substance or liquid is wholly or mainly prevented.

In order to obtain this equilibrium condition between the alginate intestine and the stuffing or liquid containing a sodium salt as regards this exchange of calcium for alkalis, calcium salts, such as, for example, calcium chloride, calcium lactate, calcium acetate, calcium gluconate, have proved extremely suitable, and are advantageous in addition as they react favourably on the human organism according to the most recent discoveries. In place of calcium salts, however, suitable metallic salts equal in their chemical effect and admissible as regards human consumption for example aluminium salts, are suitable for the purpose of the present invention.

The requisite amount of calcium or other salts depends on the nature of the salts used and the sodium content of the stuffing or liquid coming into contact with the wall of the alginate intestine. With normally salted sausage meat a molecular relation of calcium to sodium of 1:5 has shown itself to be favourable. By way of example, 0.8% of calcium chloride or 1.6% of calcium lactate are added to a sausage meat which contains 2.4% of common salt. In accordance with the conditions in each individual case the amount of calcium salt to be added is to be adjusted correspondingly. When adding a soluble calcium salt to the cooking water for Frankfurter or Vienna sausages or similar sausages which have calcium alginate skins and are prepared by boiling, the added amount of the soluble calcium salt may amount from about 0.5 to 1%, referred to the salt content of the water.

The amount of calcium or other metal salt addition to the stuffing or the liquid can be decreased if the alginate intestine is impregnated with a soluble calcium salt prior to filling. If, for example, an intestine impregnated with a calcium salt is used, then a substantially smaller addition of calcium salt to the sausage meat is already sufficient than when the alginate intestine is not so impregnated. In the production of sausages which need not be stored for long periods, an addition of calcium salt to the sausage meat can, moreover, be completely eliminated, if a sufficient amount of calcium salt has been incorporated into the alginate intestine by impregnation prior to filling.

*Example 7*

To 1 part of common salt, contained in a sausage meat containing 2% of common salt, are added 0.6 parts of calcium lactate, and the mixture is filled into a synthetic intestine produced from calcium alginate. This intestine thereupon behaves, as regards its strength characteristics, as a natural intestine.

*Example 8*

To one part of common salt in a sausage meat containing 2% common salt, are admixed 0.3 parts of calcium chloride, whereupon the mixture is filled into a calcium alginate intestine. The synthetic intestine exhibits, even after a substantial period of time, no reduction in its mechanical strength.

*Example 9*

To one part of common salt, in a sausage meat containing 2% common salt, are added 0.15 part of calcium chloride, and this mixture is then filled into a calcium alginate intestine impregnated with a 15% calcium chloride solution, which then indefinitely exhibits the same small degree of stretch.

*Example 10*

To one part of common salt, in the saline cooking water for Frankfurter sausages, having calcium alginate skins and containing 1 part of common salt to 0.3 part of calcium chloride, is added one part of calcium lactate. The synthetic skins of the sausages cooked therein retain their original strength.

*Example 11*

A normally salted sausage meat containing 2.4% of common salt is filled into an alginate intestine, which has been impregnated with a 20% calcium chloride solution. The greater part of the calcium chloride was dissolved out during cooking of the intestine, the residue sufficed however to impart the desired strength to the intestine for a length of time sufficient as regards certain types of sausages.

Having thus described and ascertained the nature of our said invention, we declared that what we claim is:

1. A method of producing continuously a water-insoluble synthetic edible sausage skin in the form of an endless, seamless tubular casing, which comprises the steps of dispersing in water, fibers of a material selected from the group consisting of cellulose, alginate, cotton, meat freed from fat, and ramie, said fibers being of a length of about 1 mm.; dissolving in said water an amount of salts of alginic acid sufficient to produce a moldable solution containing 4 to 6% of said alginic acid salts; filtering and de-aerating said solution; forming same into a tubular structure; conducting the formed tubular structure through a precipitating bath consisting of a 10 to 15% calcim chloride solution heated to a temperature ranging from about 40° C. to about 80° C., to thereby solidify the tubular structure by means of said bath, and conducting the solidified tubular structure through an aqueous aluminum salt solution to effect a hardening after-treatment.

2. In the method according to claim 1, including the step of impregnating said calcium-alginate tube with a water-soluble salt of a metal which forms a water-insoluble alginate.

3. As a new article of manufacture, a water-insoluble synthetic edible sausage skin in the form of an endless, seamless tubular casing, prepared from the process which comprises the steps of dispersing in water, fibers of a material selected from the group consisting of cellulose, alginate, cotton, meat freed from fat, and ramie, said fibers being of a length of about 1 mm.; dissolving in said water an amount of salts of alginic acid sufficient to produce a moldable solution containing 4 to 6% of said alginic acid salts; filtering and de-aerating said solution; forming same into a tubular structure; conducting the formed tubular structure through a precipitating bath consisting of a 10 to 15% calcium chloride solution heated to a temperature ranging from about 40° C. to about 80° C., to thereby solidify the tubular structure by means of said bath, and conducting the solidified tubular structure through an aqueous aluminum salt solution, to effect a hardening after-treatment.

4. A sausage comprising a sausage mass encased in a water-insoluble alginic acid salt synthetic casing, said sausage mass containing a water-soluble salt of a metal which forms a water-insoluble alginate.

5. A sausage comprising a sausage mass encased in a water-insoluble alginic acid salt synthetic casing, said casing being impregnated with a water-soluble salt of a metal which forms a water-insoluble alginate.

References Cited in the file of this patent

UNITED STATES PATENTS

| | | |
|---|---|---|
| 1,348,459 | Swett | Aug. 3, 1920 |
| 2,030,566 | Bonniksen | Feb. 11, 1936 |
| 2,045,349 | Goodman | June 23, 1936 |
| 2,070,248 | Weingand et al. | Feb. 9, 1937 |
| 2,114,220 | Freudenberg | Apr. 12, 1938 |
| 2,256,040 | Becker et al. | Sept. 16, 1941 |
| 2,313,289 | Bednar | Mar. 9, 1943 |
| 2,384,462 | Goodman | Sept. 11, 1945 |
| 2,485,512 | Rose | Oct. 18, 1949 |
| 2,627,466 | Lewis | Feb. 3, 1953 |

FOREIGN PATENTS

| | | |
|---|---|---|
| 471,566 | Great Britain | Sept. 7, 1937 |
| 572,798 | Great Britain | Oct. 24, 1945 |
| 579,004 | Great Britain | July 19, 1946 |